(12) United States Patent
Aaron et al.

(10) Patent No.: US 9,418,387 B1
(45) Date of Patent: Aug. 16, 2016

(54) EMPLOYEE CUSTOMIZABLE PAYROLL PROCESSING

(71) Applicant: Square, Inc., San Francisco, CA (US)

(72) Inventors: Paul Aaron, San Francisco, CA (US); Cody Rose, San Francisco, CA (US)

(73) Assignee: Square, Inc., San Francsco, CA (US)

( * ) Notice: Subject to any disclaimer, the term of this patent is extended or adjusted under 35 U.S.C. 154(b) by 0 days.

(21) Appl. No.: 14/106,439

(22) Filed: Dec. 13, 2013

(51) Int. Cl.
*G06F 15/02* (2006.01)
*G06Q 40/00* (2012.01)

(52) U.S. Cl.
CPC .................. *G06Q 40/125* (2013.12)

(58) Field of Classification Search
CPC ... G06Q 40/10; G06Q 30/04; G06Q 10/1091; G06Q 40/105; G06Q 10/10
USPC .......................................................... 705/32
See application file for complete search history.

(56) References Cited

U.S. PATENT DOCUMENTS

| 6,401,079 | B1 * | 6/2002 | Kahn | G06Q 20/102 705/30 |
| 6,411,938 | B1 * | 6/2002 | Gates | G06Q 20/042 705/30 |

* cited by examiner

*Primary Examiner* — Garcia Ade
(74) *Attorney, Agent, or Firm* — Perkins Coie LLP (57) ABSTRACT

Various embodiments are related to apparatuses and methods related to payroll processing. An employee can designate a customized payroll pay period, and each employee can designate a different payroll pay period. For example, the employee can designate to receive payroll payments on any frequency supported by the employer, including receiving a daily payroll payment on each day that the employee works. The employee's employer can make payroll payments according to the employee's designation. Further, when the employer is a merchant that makes sales each day using, for example, a point of sale system, the employer can electronically pay the employee using funds from the day's sales. For example, the employee can work on a selected day, and can receive an electronic payroll payment at the end of the shift. The employee can immediately use the just received electronic payment funds to purchase a good from a second merchant.

21 Claims, 5 Drawing Sheets

EMPLOYEE CUSTOMIZABLE PAYROLL PROCESSING

BACKGROUND

Many companies utilize payroll systems and payroll automation to produce paychecks, which are paper documents issued by an employer to pay an employee for services rendered. Such payroll systems perform functions such as calculating and paying wages and determining tax withholdings. Recently, physical paychecks have been increasingly replaced by electronic payments, such as direct deposits to bank accounts.

Paychecks and electronic payments are typically sent out on a regular payroll pay period, for example, weekly, bi-weekly (i.e., every two weeks), bi-monthly (i.e., twice a month), or monthly. At many companies, all employees have the same payroll pay period, which is set by management, and receive paychecks and/or electronic payments on the same day. At some companies, employees in different payroll categorizations are paid in different payroll pay periods. For example, the payroll pay period for hourly employees may be weekly while the payroll pay period for salaried employees may be bi-monthly.

In some cases, an employee may receive a payroll payment bi-monthly. However, the employee may have to pay rent weekly, meaning that the employee must manage the money from each payroll payment to make two, and occasionally even three, rent payments. If the employee is not successful at managing money, the employee may run out of money and may not be able to make a rent payment. Consequently, the employee may need to resort to a payday loan, resulting in the employee incurring the very expensive fees and interest rates that come with such a loan.

BRIEF DESCRIPTION OF THE DRAWINGS

Embodiments of the present invention will be described and explained through the use of the accompanying drawings in which.

The drawings are not necessarily drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

The phrases "in some embodiments," "according to various embodiments," "in the embodiments shown," "in one embodiment," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

DETAILED DESCRIPTION

This application introduces technology related to payroll processing, in which each employee can designate a customized payroll pay period. Even when two employees have the same job function and the same payroll categorization, the two employees can each designate a different payroll pay period. For example, a first employee and a second employee each have the same job function, such as an assembly line worker working on the same assembly line. The first and second employees also have the same payroll categorization, each being an hourly employee. The first and the second employees, while sharing the same job function and payroll categorization, can each designate a different payroll pay period. For example, the first employee can designate to receive a payroll payment bi-weekly, while the second employee can designate to receive a payroll payment each day that the second employee works. With this daily payroll payment designation, the second employee can work Monday through Friday, and can receive a payroll payment on Monday, Tuesday, Wednesday, Thursday, and Friday.

Some people have very little money and live paycheck to paycheck. Sometimes these people cannot make it to the next paycheck, so they have to obtain a payday loan. For example, a person who receives a bi-weekly paycheck but has to pay rent weekly may need to obtain a payday loan to pay the second week's rent as a result of running out of money. A payday loan is a short-term loan that the borrower promises to repay out of his next paycheck, or next several paychecks. These types of loans are very expensive, with interest rates that can run from 300 percent to 1,000 percent, or even more. For example, for a $15 charge on a $100 two-week payday loan, the annual percentage rate is 3,686%. Part of the reason that the payday loan lenders charge such exorbitant rates is because payday loans have a high default rate of 10-20%. People in such situations would benefit significantly by being able to designate a payroll pay period that matches their monetary needs, for example benefiting by avoiding having to take a payday loan.

If the employee were able to designate a payroll pay period, the employee could decide to receive a payroll payment that more closely matched his monetary needs. For example, an employee who has rent due each Friday could decide to receive a payroll payment each Friday. This would result in the employee receiving a payroll payment each day that rent is due, thereby ensuring that funds are available to pay the rent.

With the technique introduced here, an employee can designate a customized payroll pay period. The payroll pay period can be customizable to whatever degree or extent the employer allows. For example, when the employer allows, the employee can designate to be paid daily on each day that the employee works, or every other day, or every third day, etc. The employee can further designate the day on which to be paid. For example, when the employee designates to be paid weekly, the employee can further designate to be paid on Fridays.

When the employer is a merchant that utilizes a buyer/seller platform to make sales, the funds for the employee payroll payment can come from the collections made using the buyer/seller platform. A buyer/seller platform is a machine-implemented processing system that can enable merchants to engage in financial transactions with customers for the sale of goods and/or services, and can process the electronic payments associated with the financial transactions. For example, an employee has designated to receive a daily payroll payment. The employee earns $100 during a shift, and the merchant sells merchandise for which the merchant receives $1000 in electronic payments, such as from credit cards or automated teller machine (ATM) cards. Utilizing the buyer/seller platform, the employer can elect to use $100 of the $1000 of electronic payments to pay the employee. The $100 can be automatically sent to the employee's financial account. When the financial account is with a bank, the funds may not show up in the financial account until the next day, or even later. However, when the employee's financial account is at the buyer/seller platform, the funds can be immediately available, and can be immediately used with any merchant that utilizes the buyer/seller platform.

For example, Merchant 1 (i.e., the merchant that employs the employee), Merchant 2 (e.g., a coffee shop owner), and the employee's financial account all utilize the a buyer/seller platform. Merchant 1 can make a payroll payment of $100 to the employee using electronic payment funds from merchandise sales from that day. Once Merchant 1 executes the payroll payment, the $100 will be immediately transferred to the employee's financial account even though Merchant 1 has not received the $100 in electronic payments (due to the time it takes the funds to be transferred between the various accounts). Using the technology introduced here, Merchant 1's payroll processor (i.e., the company that sends the payroll payments to the employee) can send funds to Merchant 1 to cover the $100 payroll payment, and the employee can immediately use the funds to purchase goods from Merchant 2. The sent funds can be repaid to the payroll processor using the funds from the electronic payments for the day's sales, which may be collected by the buyer/seller platform on the next day, or even later.

The technology introduced here enables the employee to work on a selected day and receive a payroll payment from Merchant 1 on that same day. Using floated funds to be repaid using the electronic payments for the day's sales, the payroll payment can be sent to the employee's financial account as soon as the employee's work shift ends. The employee can walk across the street to the coffee shop operated by Merchant 2, and can use the funds from the just received payroll payment to pay for a coffee purchased from Merchant 2. Each of the preceding electronic fund transfers can be handled by the buyer/seller platform.

Further, the employer's payroll processor, utilizing the technology introduced here, can provide a low-cost loan to employees. As previously discussed, part of the reason that payday loan companies charge such high fees and interest rates is due to a very high default rate on payday loans. The payroll processor can make similar loans, but with a much lower default rate, thereby enabling significantly lower charges and interest rates. Having access to past payroll payments made to employees enables the payroll processor to more accurately predict future payroll payments. Having control over payroll payments to employees enables the payroll processor to achieve much lower loan default rates. With appropriate legal agreements, rather than relying on a contractual promise from a payday loan recipient, as is sometimes done by payday loan companies, the payroll processor can automatically obtain a loan repayment from the employee's future wages before the associated payroll payment is sent to the employee.

Figure 1:
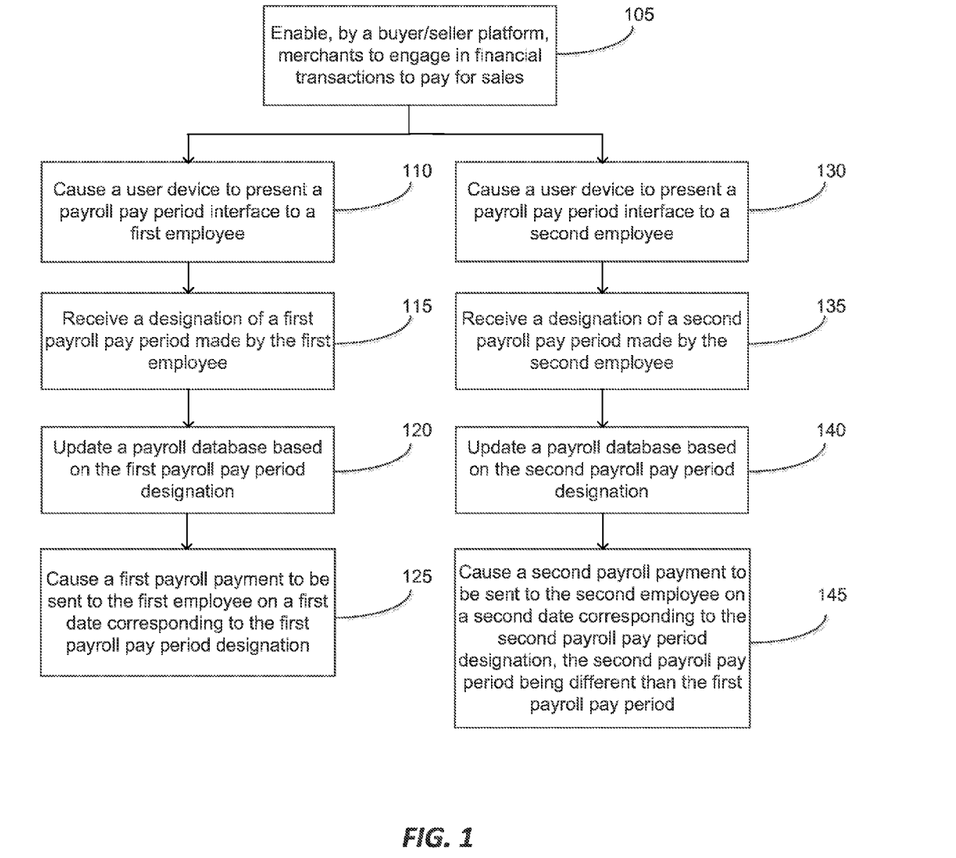
FIG. 1 is a flow chart illustrating operations of a method for designating a payroll pay period.

FIG. 1 is a flow chart illustrating operations of a method for designating a payroll pay period. The following description of FIG. 1 will be described using the system illustrated in FIG. 2, and will refer to labels of that figure. This is a non-limiting example and is done with the intent of making the description of FIG. 1 easier to understand. Note that, in some embodiments, including the embodiment of FIG. 2, all steps of the method of FIG. 1 can be carried out by buyer/seller platform 255 implemented on computer system 250.

Figure 2:
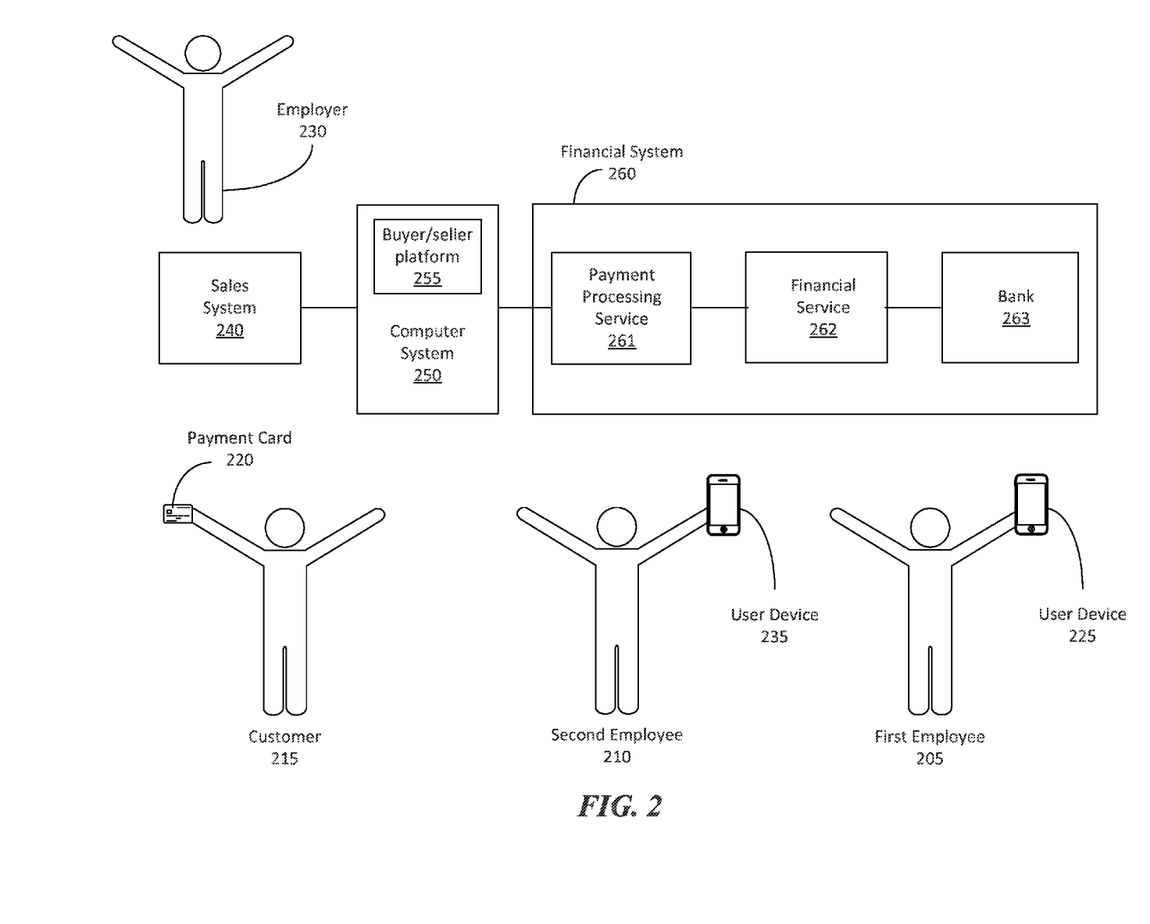
FIG. 2 is a diagram illustrating components of or associated with a method for designating a payroll pay period.

Step 105 includes enabling, by a buyer/seller platform, merchants to engage in financial transactions to pay for sales, for example the sales of goods and/or services. A buyer/seller platform can enable merchants to engage in financial transactions with customers for the sale of goods and/or services, and can process the electronic payments associated with the financial transactions. In some embodiments, the buyer/seller platform can work in conjunction with financial system 260 to process some or all of the electronic payments. Computer system 250 can be referred to as a networked computer system.

A merchant, such as employer 230, can enter into a financial transaction with a customer, such as customer 215, to pay for the sale of a good. The merchant, utilizing a sales system, such as sales system 240 that communicates with the buyer/seller platform implemented on computer system 250, can sell the good to the customer. The buyer/seller platform can process a payment for the good made by the customer using a payment card, such as payment card 220. The buyer/seller platform, utilizing financial system 260, can obtain funds from an account associated with the payment card and deposit a portion of the funds into a financial account associated with the merchant, for example a bank account at bank 263. Step 105 can include enabling, by a buyer/seller platform implemented on computer system 250, merchants to engage in financial transactions to pay for sales, for example sales of goods and/or services.

Step 110 includes causing a user device to present a payroll pay period interface to a first employee. Step 110 can occur before or after step 105. Using the example of FIG. 2, the user device can be user device 225, which is a smart phone such as an iPhone in the example of FIG. 2. The first employee can be first employee 205, and first employee 205 can be employed by employer 230, who can be a merchant. The money that an employer pays an employee for services rendered for the benefit of the employer or the employer's company can be payroll pay. Payroll pay can be delivered to the employee in any of various ways. For example, the employer can deliver the payroll pay to the employee via a check (also called a paycheck), via cash, via a prepaid card such as a gift card, and via an electronic payment, among other ways. A payroll payment can be the transfer of these funds, such as by the delivery of the check or the prepaid card, or the sending of the electronic payment, or the delivery of the cash. The electronic payment can be sent, for example, to a financial account associated with the employee.

A payroll pay period is the duration between payroll payments. In some embodiments, a payroll pay period can be time-based and of fixed-duration. For example, a payroll payment can be made each week, or every two weeks, or twice a month, or each month, among other durations. The associated payroll pay period can be weekly, bi-weekly, bi-monthly, and monthly, respectively. In some embodiments, payroll pay periods can be of variable duration and can be triggered by an event. For example, a payroll payment can be made each day or shift that an employee works. The associated payroll pay period can be triggered by the employee working a day or a shift.

In this example, if an employee worked three days or shifts in a week, the employee would receive three payroll payments, each payroll payment triggered by working a day or a shift. The payroll pay period can be the variable duration between the payroll payments. As a second example, a payroll payment can be made each time an employee makes a sale. The associated payroll pay period can be triggered by the employee making a sale. In this example, if an employee made ten sales in a day, the employee can receive ten payroll payments, each payroll payment and payroll pay period triggered by the employee making a sale.

A payroll pay period interface, also referred to as the interface, can be any interface that enables an employee to designate a payroll pay period. By enabling the employee to designate the payroll pay period, the payroll pay period interface can also accept the employee's designation of the payroll pay period. In some embodiments, the payroll pay period interface can be, for example, a web interface presented via a web browser, such as Microsoft's Internet Explorer or Google's Chrome browser. The web interface can provide a set of available payroll pay period options from which the employee can select a payroll pay period, thereby designating a payroll pay period. The web interface can enable the employee to specify any arbitrary or variable payroll pay period, for example, by providing a sliding bar that the employee can slide to select the payroll pay period. The web interface can enable the employee to designate an event that can trigger a payroll pay period, for example selecting an option to receive a payroll payment upon each sale by the employee. The web interface can enable the employee to designate the payroll pay period by typing in the arbitrary or variable payroll pay period, or by speaking the arbitrary or variable payroll pay period and utilizing speech recognition to interpret the spoken payroll pay period.

In some embodiments, the payroll pay period interface can be a customized interface developed via a programming language, such as C, C++, python, or java, among other programming languages. In some embodiments, the payroll pay period interface can be a piece of paper allowing the employee to designate or select a payroll pay period. When the employee fills out the piece of paper, including identifying a payroll pay period, and returns the paper to the employer, the employee is designating a payroll pay period. In some embodiments, the payroll pay period interface can be a person working in human resources who asks the employee to designate or select a payroll pay period. When the employee responds with the desired payroll pay period, the employee is designating a payroll pay period.

For example, first employee 205 can have filled out a human resources form wherein first employee 205 indicated the first payroll pay period. As a second example, first employee 205 can have talked to a human resources employee of employer 230. First employee 205 can have designated a first payroll pay period by telling the human resources employee first employee 205's desired payroll pay period. In some embodiments, the human resources employee can then use a user device, such as a user device similar to user device 225, to capture the first payroll pay period for first employee 205.

In some embodiments, a computer system, such as computer system 250, or a buyer/seller platform implemented on computer system 250, can cause the payroll pay period interface to be presented to the employee by sending executable code to a user device, such as user device 225. The user device can execute the code, which can cause the user device to display the payroll pay period interface. In some embodiments, the computer system can cause the interface to be presented by sending a message containing input to a program. For example, the input can be html code and the program can be Internet Explorer. Internet Explorer can read and interpret the html code, which can cause the user device to display the payroll pay period interface.

In some embodiments, the payroll pay period is capable of being customized by each employee of a plurality of employees of an employer. For example, the employee can customize the payroll pay period by selecting, or directing someone to select, a payroll pay period from a set of payroll pay periods. The set of payroll pay periods can be a pre-defined list of payroll pay periods. The employee can customize the payroll pay period in any of various ways. For example, by selecting a payroll pay period using a user device, such as user device 225, or by filling out a form, or by designating an event that triggers a payroll pay period, or by typing an arbitrary or variable payroll pay period using a user device, or by writing an arbitrary or variable payroll pay period on an appropriate form, or by directing another person, such as a human resources person, to select or designate a payroll pay period for the employee, among other ways.

As another example, the payroll pay period can be customized by the user sliding a slide bar using a user device, the slide bar being part of a payroll pay period interface that is displayed on the user device. By sliding the slide bar, the user can vary the payroll pay period until reaching the desired value, thereby customizing the payroll pay period. Step 110 can include a buyer/seller platform implemented on computer system 250 causing a user device, such as user device 225, to present a payroll pay period interface to a first employee, such as first employee 205.

Step 115 includes receiving a designation of a first payroll pay period made by a first employee. Step 115 can occur after step 110. Using the example of FIG. 2, the designation can be received from a user device, such as user device 225, and the first employee can be first employee 205. As discussed in step 110, the payroll pay period can be customized by employees. Each employee can designate a custom payroll pay period, which can be different from other employees. A first employee can designate a first payroll pay period, for example setting the first payroll pay period to weekly.

The designation and customization of the first payroll pay period made by the first employee can have happened using the payroll pay period interface of step 110. Step 115 can include a buyer/seller platform implemented on computer system 250 receiving, from a user device, such as user device 225, a designation of a first payroll pay period made by a first employee. The designation and customization could have been made, for example, by first employee 205 using the payroll pay period interface of step 110 displayed on user device 225 to make the designation, the designation also being a customization.

Step 120 includes updating a payroll database based on the first payroll pay period designation. Step 120 can occur after step 115. The first payroll pay period designation can have happened using the payroll pay period interface of step 110 displayed on user device 225, and could have been received from user device 225 during step 115. The payroll database can be a database containing payroll information, such as the payroll pay period designation. The payroll database can associate employees with employers, and employees with payroll pay period designations, among other associations. Using the example of FIG. 2, step 120 can include a buyer/seller platform implemented on computer system 250 updating a payroll database based on the first payroll pay period designation, the first payroll pay period designation having been made using the payroll pay period interface of step 110 displayed on user device 225, and having been received from user device 225 by computer system 250 during step 115.

Step 125 includes causing a first payroll payment to be sent to the first employee on a first date corresponding to the first payroll pay period designation. Step 125 can occur after any of steps 115-120. Using the example of FIG. 2, the first employee can be first employee 205. The first payroll payment can be sent to the first employee in any of various ways. For example, the first payroll payment can be sent to the first employee via a paycheck, via cash, via a prepaid card such as a gift card, a prepaid credit card, a prepaid debit card, or another type of prepaid card, or via an electronic payment, among other ways. When the first payroll payment is sent via a paycheck or a prepaid card, the paycheck or prepaid card can be sent to the first employee in any of various ways. For example, the paycheck or prepaid card can be given to the first employee by the employer or a representative of the employer, or the paycheck or prepaid card can be mailed to an address associated with the employee.

A computer system, such as computer system 250, or a buyer/seller platform implemented on computer system 250, can cause a paycheck or a prepaid card to be sent to an employee. For example, computer system 250, which can be part of the buyer/seller platform, can send a message to an automated system, which causes the automated system to create a payroll payment check (i.e., a paycheck) or a prepaid card, and to place the check or the prepaid card in an envelope containing sufficient postage. The check or prepaid card can be placed in the mail and delivered to the employee, thereby completing the sending of the paycheck to the employee. When the first payroll payment is sent via an electronic payment, the first payroll payment can be sent by a computer system, such as computer system 250, or by a buyer/seller platform implemented on computer system 250, to a financial account associated with the first employee.

A financial account associated with the first employee can be any account associated with the first employee that can receive funds. The financial account can be, for example, the first employee's bank account, or the first employee's credit union account, or a financial account maintained by a third party for the benefit of the first employee such as a financial account at the buyer/seller platform. When the financial account is maintained by a third party, the third party can hold funds for the benefit of multiple people and/or entities. The funds for multiple people or entities can be deposited in one or more bank or credit union accounts, among other places. The third party can maintain an accounting of the funds held for the benefit or each person or entity. The third party can be, for example, a payroll processor, such as the company that sends the payroll payments, or that causes the payroll payments to be sent, to the employee.

A date can correspond to a payroll pay period designation when the payroll pay period designation leads to a payroll payment occurring on the date. For example, when the payroll pay period designation is weekly on Fridays, the payroll payment can happen each week on Friday, and each Friday can correspond to the payroll pay period designation.

The funds for the payroll payment can come from financial transactions, such as the financial transactions of step 105. For example, employer 230 (i.e., the merchant) can sell a good to customer 215, and customer 215 can pay for the purchase using payment card 220. The merchant can process the payment utilizing a buyer/seller platform implemented on computer system 250. The buyer/seller platform can obtain funds to pay for the purchase from an account associated with payment card 220, and can deposit a portion of the funds, the portion including 100% of the funds, into a financial account associated with the merchant. In some cases, it may take a day or longer for the funds from the financial transaction to show up in the financial account associated with the merchant due to the time it takes to process the associated fund transfers between accounts, as can be done by the buyer/seller platform in conjunction with financial system 260.

However, when the payroll payment is made on a selected date, and the merchant desires to use funds from the financial transactions of the selected date, the funds may not be available until the next day or even later due to the time required to obtain the funds from the accounts associated with the payment cards. In this situation, a third party, such as the payroll processor, can float funds for the payroll payment to the merchant. Floated funds can be funds loaned on a short term basis to cover electronic payments in progress but not yet received.

For example, a merchant can make $1000 in sales to customers using payment cards on the selected date. If the merchant wants to make a $100 payroll payment to an employee on the selected date, and wants to utilize the funds from the $1000 in sales, it may take a day or even longer to obtain the funds, so the funds may not be available on the selected date. A third party, such as the payroll processor, can float funds to the merchant to cover a portion of the $1000 in sales made using payment cards, funds from which may not have yet been received. The floated funds can be used to make the $100 payroll payment to the employee and can be repaid using the funds obtained from the accounts associated with the payment cards.

Further, the employee can purchase a good from a second merchant that utilizes the buyer/seller platform on the selected date. Because electronic transfers of funds made utilizing the buyer/seller platform are available nearly immediately, any merchant utilizing the buyer/seller platform can access those funds nearly immediately after the funds are electronically transferred between accounts at the buyer/seller platform. This enables the employee to make a purchase with any merchant utilizing the buyer/seller platform nearly immediately after the payroll payment is made to the employee's account at the buyer/seller platform. Step 125 can include a buyer/seller platform implemented on computer system 250 causing a first payroll payment to be sent to the first employee, such as first employee 205, on a date corresponding to the first payroll pay period designation, such as the first payroll pay period designation received during step 115.

Step 130 includes causing a user device to present a payroll pay period interface to a second employee. Step 130 can occur before or after any of steps 105-125. Step 130 can be similar to step 110, except applied to the second employee in place of the first employee. Step 130 can include a buyer/seller platform implemented on computer system 250 causing a user device, such as user device 235, to present a payroll pay period interface to a second employee, such as second employee 210.

Step 135 includes receiving a designation of a second payroll pay period made by the second employee. Step 125 can occur after step 130 and before or after any of steps 110-125. Using the example of FIG. 2, the second employee can be second employee 210 and can be employed by employer 230, who can be a merchant. As discussed in step 110, the payroll pay period can be customized by employees. Each employee can designate a custom payroll pay period, which can be different from other employees. Just as the first employee can designate a first payroll pay period, for example setting the first payroll pay period to weekly, a second employee can designate a second payroll pay period, for example setting the second payroll pay period to each day that the second employee works.

Further, the first employee and the second employee can have designated their respective payroll pay periods in different manners. For example, the first employee can have designated his payroll pay period by selecting a payroll pay period using the payroll pay period interface of step 110. The second employee can have designated his payroll pay period by communicating his desired pay period to a representative of the merchant, for example a person working in human resources. As this demonstrates, both the first and the second employees can customize their respective payroll pay period, and the two payroll pay periods can be different. Step 135 can include a buyer/seller platform implemented on computer system 250 receiving a designation of a second payroll pay period made by a second employee, such as second employee 210.

Step 140 includes updating a payroll database based on the second payroll pay period designation. Step 140 can occur after step 135 and before or after any of steps 110-125. Using the example of FIG. 2, a buyer/seller platform implemented on computer system 250 can update a payroll database based on the second payroll pay period designation, the designation received during step 135.

Step 145 includes causing a second payroll payment to be sent to the second employee on a second date corresponding to the second payroll pay period designation, the second payroll pay period being different than the first payroll pay period. Step 145 can occur before or after any of steps 110-125, and can happen after steps 135 or 140. Using the example of FIG. 2, the second employee can be second employee 210. Step 145 can be the same as step 125, except applied to the second employee based on the second employee's payroll pay period.

Step 145 can also involve causing a second payroll payment to be sent in a manner different than was used to send the first payroll payment. For example, per the discussion of step 125, the first payroll payment can be sent via a paycheck. The second payroll payment can be sent in a different manner than the first payroll payment, such as via an electronic payment. Step 145 can include a buyer/seller platform implemented on computer system 250 sending a second payroll payment to the second employee, such as second employee 210, on a second date corresponding to the second payroll pay period designation made by the second employee. The second payroll pay period can be different than the first payroll pay period.

FIG. 2 is a diagram illustrating components of or associated with a method for designating a payroll pay period. FIG. 2 includes first employee 205, second employee 210, customer 215, payment card 220, user device 225, employer 230, user device 235, sales system 240, computer system 250, buyer/seller platform 255, financial system 260, payment processing service 261, financial service 262, and bank 263. Employer 230 can be an employer that employs first employee 205 and second employee 210. Customer 215 can be a customer of the business of employer 230. Customer 215 can make a purchase using payment card 220. User device 225 can be any electronic device which can be used by an employee, such as first employee 205 or second employee 210, or by someone assisting the employee, such as a human resource person, to designate a payroll pay period. Examples of a user device, such as user devices 225 and 235, can include a computer system such as computer system 600 of FIG. 6, a smart phone such as an iPhone, a tablet such as an iPad, a portable media devices such as an iPod, a wearable device such as Google Glass or Samsung Smartwatch, a laptop or other portable computer, and a desktop computer. Computer system 250 can be computer system 600 of FIG. 6.

Sales system 240 can include any system that can perform a transaction with a customer, such as customer 215, using a payment card, such as payment card 220. Examples of systems that can comprise sales system 240 include point of sale (POS) systems, cash registers, computer systems running sales applications including mobile devices running sales applications, cloud based POS systems, checkout registers, computer systems running internet based applications such as a web browser, and the like. Sales system 240 can include components such as a card reader, a scanner, a cash drawer, among other components. A person of ordinary skill in the art will appreciate that there are many systems that can comprise sales system 240.

Buyer/seller platform 255 can be implemented on a computer system, such as computer system 250. Buyer/seller platform 255 can enable merchants to engage in financial transactions with customers for the sale of goods and/or services, and can process the electronic payments associated with the financial transactions. For example, customer 215 can purchase a good from employer 230, a merchant, and can enter into a financial transaction associated with the purchase. The financial transaction can include a payment by customer 215 for the good, and the payment can be made by customer 215 using payment card 220. Payment card 220 can be read by a card reader that is part of sales system 240, and the payment card and purchase transaction information can be sent to computer system 250. In some embodiments, buyer/seller platform 255 implemented on computer system 250 can receive the payment card and purchase transaction information, and can process the electronic payment made using payment card 220 utilizing financial system 260. Buyer/seller platform 255 can obtain the electronic payment funds from a financial account associated with payment card 220, and can transfer the electronic payment funds to a financial account associated with the merchant.

Financial system 260 can be any financial system that can process payments made using a payment card, such as payment card 220. In some embodiments, financial system 260 can include payment processing service 261, financial service 262, and bank 263. Payment processing service 261 can be, for example, Bank of America Merchant Services. Financial service 262 can be, for example, VISA's VisaNet Payment System. Bank 263 can be, for example, Chase Bank. A person having ordinary skill in the art will appreciate that there are a number of companies that provide payment processing services, financial services, and banking services, and that can provide the services of payment processing service 261, financial service 262, and bank 263, respectively.

Payment card 220 can be a magnetic stripe card, a smart card, a proximity card, a re-programmable magnetic stripe card, a card containing a quick response (QR) code, a card containing a bar code, or a proxy card, among other cards. Examples of payment cards include credit cards, charge cards, ATM cards, debit cards, pre-paid credit cards, pre-paid debit cards, gift cards, stored value cards, and fleet cards, among other cards. A proxy card can be a card that can be associated with various payment cards, and can be used to make a purchase wherein the funds for the purchase come from one of the various payment cards.

Figure 3:
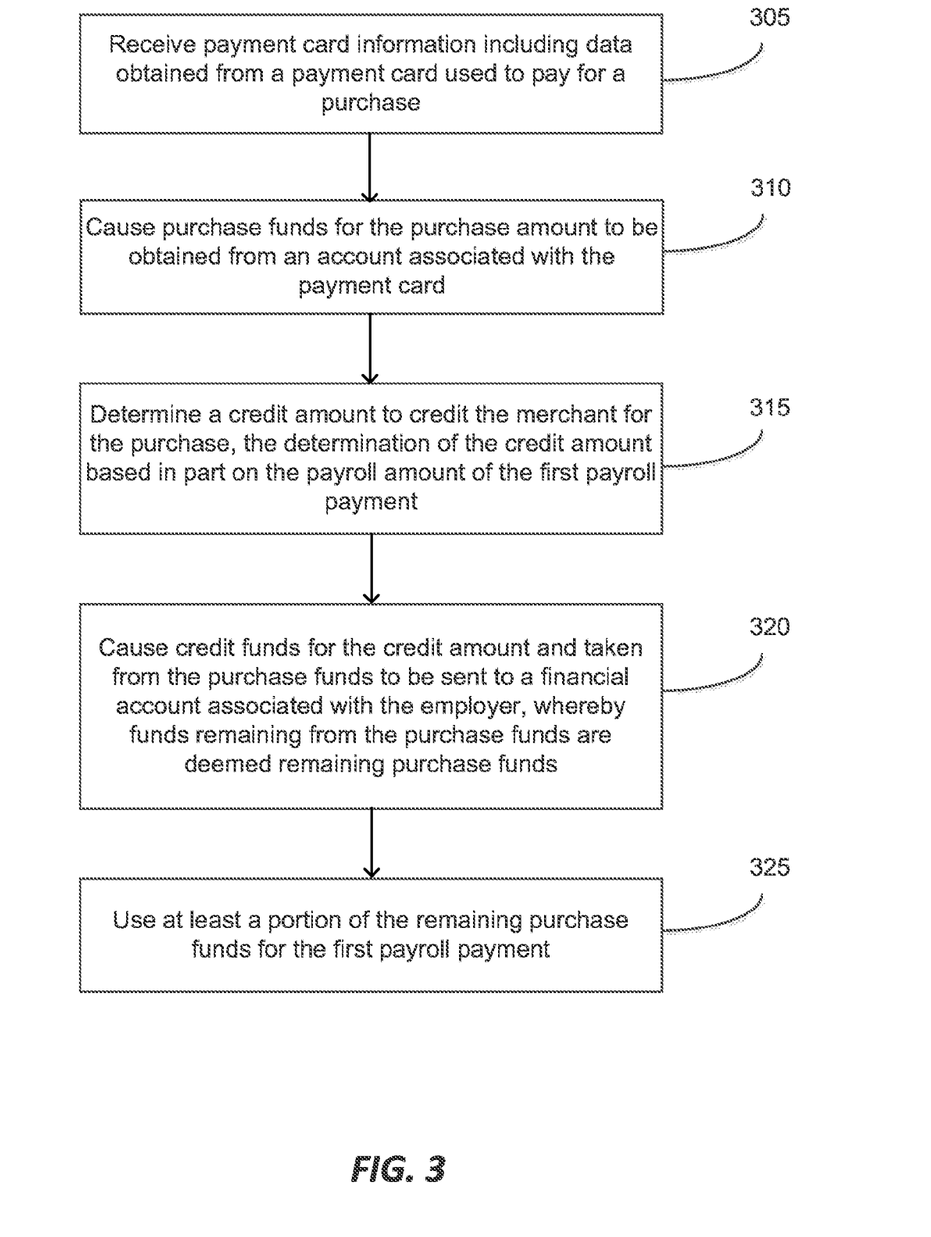
FIG. 3 is a flow chart illustrating operations of a method for funding a payroll payment.

Prior to discussing FIG. 3, it may be useful to discuss some concepts and examples. In some embodiments, described at a high level, a payroll payment for an employee can be paid from credit card and ATM card payments (i.e., payment card payments) that customers make to an employer to pay for purchase transactions. For example, an employee can earn $100 for working on a day, and the employee can designate their payroll pay period to be each day that the employee works. The employer owes the employee $100 for the employee's payroll payment for the day. The employer can make, for example, $1000 in sales for the day that are paid for with payment cards which a purchase transaction processing company (PTPC) can process. The PTPC can obtain the $1000 from the various payment cards. From this $1000, the employer can make the $100 payroll payment to the employee, and can have the remaining $900 credited to the account of the employer. When all the money transfers discussed above are electronic transfers, the employee can have immediate access to the $100 payroll payment. For example, when the payroll payment is made the same day that the employee works, the employee can have access to and spend the $100 that same day.

However, when the payroll payment is made on a selected date, and the employer desires to use funds from payment card payments made on the selected date, the funds may not be available until the next day or even later due to the time required to obtain the funds from the accounts associated with the payment cards. In this situation, a third party, such as the PTPC, can float funds for the payroll payment to the merchant.

As a second high-level example, a waiter can earn $50 in wages and $100 in tips working on a day. The tips can all be paid by credit or ATM cards. In many cases, the employer is expected to pay the tips on the same day that the tips are earned. In this example, the employer is expected to pay the waiter the $100 in tips that the waiter earned while working that day. However, the employer may not have enough cash sales to have enough cash in the register to pay the employee's tips at the end of the employee's shift. Historically, the employer would have to go to a bank and withdraw enough cash to pay employee tips. With this historical method, the employer can need to withdraw and safely store thousands of dollars to pay out the employees' tips.

Utilizing the technology introduced here, the employer does not need to go to the bank and withdraw and safely store the thousands of dollars needed to pay the employees' tips at the end of the employees' shifts. The employer can make, for example, $1000 in sales for the day that are paid for with payment cards, which a PTPC can process. The PTPC can obtain the $1000 from the various payment cards. From this $1000, the employer can make the $50 wage payment plus the $100 tip payment to the employee, and can have the remaining $850 credited to the account of the employer. When all the money transfers discussed above are electronic transfers, the employee can have immediate access to the $150 payroll payment. For example, when the payroll payment is made the same day that the employee works, the employee can have access to and spend the $150 that same day. Per earlier discussions, when needed, the employer can use floated funds to make the payroll payment.

Further, the employee can elect different payroll pay periods for the tips and the wages, and the tip payment and the wage payment can each be a payroll payment. For example, the employee can elect to receive tip payments each day that the employee works, and can elect to receive wage payments once a week. The above discussions ignore the effects of service charges and/or fees on the various financial transactions. A person having ordinary skill in the art will appreciated how the amounts of the payments and transactions will vary as a result of financial transaction service charges and/or fees.

FIG. 3 is a flow chart illustrating operations of a method for funding a payroll payment. The following description of FIG. 3 will be described using the system illustrated in FIG. 2, and will refer to labels of that figure. This is a non-limiting example and is done with the intent of making the description of FIG. 3 easier to understand. Note that, in some embodiments, including the embodiment of FIG. 2, all steps of the method of FIG. 3 can be carried out by buyer/seller platform 255 implemented on computer system 250.

Step 305 includes receiving payment card information including data obtained from a payment card used to pay for a purchase. Using the example of FIG. 2, the payment card can be payment card 220, and a customer, such as customer 215, can have used the payment card to pay for the purchase. A customer, such as customer 215, can make a purchase at the place of business of an employer, such as employer 230. The employer can be a merchant. For example, when employer 230 has a place of business that is a coffee shop, customer 215 can purchase a coffee from the coffee shop. When making the purchase, customer 215 can provide a payment card, such as payment card 220, to pay for the purchase. Payment card 220 can be, for example, a credit card such as a VISA card. Payment card information can include data obtained from a payment card.

As one example, a sales system, such as sales system 240, coupled to a buyer/seller platform, for example implemented on computer system 250, can be used by employer 230 to sell a coffee to customer 215. Customer 215 can pay for the coffee using payment card 220, for example, a VISA credit card. The VISA credit card can be swiped through a card reader that is part of sales system 240, and the card reader can read data from the magnetic stripe of the VISA credit card. The payment card information can include the data from the VISA card read by the card reader, as well as additional information. For example, the payment card information can include a zip code or a personal identification number (PIN) provided by customer 215 as part of a verification process. Step 305 can include the buyer/seller platform implemented on computer system 250 receiving payment card information. The payment card information can include data obtained from a payment card, such as payment card 220, used to pay for a purchase made by a customer, such as customer 215, from the employer, such as employer 230. The purchase can be made for a purchase amount.

Step 310 includes causing purchase funds for the purchase amount to be obtained from an account associated with the payment card. Step 310 can occur after step 305. Using the example of FIG. 2, the payment card can be payment card 220. Payment card 220 can be, for example, a VISA credit card. The VISA credit card can be issued by a bank, such as bank 263. Bank 263 can have a credit account associated with the VISA credit card. As a second example, payment card 220 can be an automated teller machine (ATM) card. The ATM card can be issued by a bank, such as bank 263. Bank 263 can have a checking account associated with the ATM card. Purchase funds can be the funds to pay for a purchase made by a customer, and can be an aggregate of funds to pay for multiple purchases by multiple customers.

Using the coffee purchase example of step 305, when customer 215 pays for the coffee using the VISA credit card (i.e., the payment card), the funds to pay for the purchase can be obtained from an account associated with the payment card. For example, bank 263 can have a credit account associated with the VISA credit card. When customer 215 pays for the coffee using the VISA credit card, the VISA credit card can be swiped through a card reader that is part of sales system 240. Sales system 240 can send the payment card information, which includes data obtained from the VISA credit card by the card reader, along with the purchase transaction information, such as the purchase amount, to the buyer/seller platform implemented on computer system 250. The buyer/seller platform implemented on computer system 250 can send the payment card information and the purchase transaction information to financial system 260.

Financial system 260 can obtain and provide funds to pay for the purchase transaction. For example, financial system 260 can debit the credit account associated with the VISA credit card for the purchase amount. Financial system 260 can credit another account, such as an account associated with employer 230, for the purchase amount. The account associated with employer 230 can be, for example, a business account at bank 263. In some embodiments, the business account can be a business account whose entire assets are owned by employer 230. In some embodiments, the business account can be a business account that is held by an entity for the benefit of a number of people or entities. In some embodiments, the time for financial system 260 to obtain and provide the funds to pay for the purchase transaction can be a day or longer.

For example, a financial entity, such as a purchase transaction processing company (PTPC), can exercise control over computer system 250, either directly or through a third party. The control can be via a buyer/seller platform implemented on computer system 250. The PTPC can receive payment transactions from a number of different entities or people, and can process those payment transactions. In some embodiments, the PTPC can process the payment transactions utilizing a buyer/seller platform. For example, the PTPC may process a credit card payment of $100 for company A, and may process an ATM payment of $50 for company B. The PTPC can process these two payments in any of a variety of ways, including utilizing the buyer/seller platform. In a first example, the PTPC can arrange for the funds to be debited from the account associated with the credit or ATM card, and then can credit those funds to accounts associated with the two companies. For example, $100 can be credited to a business account owned by Company A, and $50 can be credited to a business account owned by Company B.

In a second example, in which the PTPC can also utilize a buyer/seller platform, the PTPC similarly arranges for the funds to be debited from the accounts associated with the credit or ATM card. However, in this scenario, the $100+$50 in funds is credited to an account owned by the PTPC, and wherein the PTPC is holding those funds for the benefit of Company A and Company B. The account owned by the PTPC can be a business account with bank 263. The PTPC can maintain an accounting of the funds that are being held for the benefit of Company A and Company B. For example, the business account can hold the $150, and the PTPC would maintain an accounting that showed that $100 of this account was being held for the benefit of Company A, and $50 of this account was being held for the benefit of Company B. When the PTPC debits funds for a purchase transaction from an account, such as the checking account associated with the ATM card, the PTPC is obtaining the funds for the purchase transaction from the checking account associated with the ATM card.

The PTPC can hold the funds of a number of entities and/or people in this same business account, and for the benefit of the entities and/or people. The PTPC can also transfer funds between buyer/seller platform accounts of people or entities without transferring the funds between accounts in financial system 260. The PTPC can transfer the funds between the buyer/seller platform accounts by just updating the accounting of the funds that the PTPC is holding for the benefit of the various entities and/or people. Note that fees associated with transfers between accounts utilizing financial system 260 can be avoided, in that transferring funds between accounts at the buyer/seller platform does not need to involve financial system 260. A person having ordinary skill in the art will appreciate that there are a number of ways that payments can be processed. Step 310 can include a buyer/seller platform implemented on computer system 250 causing purchase funds for the purchase amount to be obtained from an account associated with the payment card, such as payment card 220.

Step 315 includes determining a credit amount to credit the merchant for the purchase, the determination of the credit amount based in part on the payroll amount of the first payroll payment. Step 315 can occur after step 305, and before or after step 310. Using the example of FIG. 2, the merchant can be employer 230. The first payroll payment can be a payroll payment for first employee 205.

Employer 230 can desire to make a payroll payment to first employee 205 using funds from the day's sales. When cash sales are adequate, employer 230 can take cash funds from the day's cash sales to make the payroll payment to first employee 205. When payment card sales are adequate, utilizing the technology introduced here, including using floated funds when needed, employer 230 can utilize funds from the payment card sales to make the payroll payment to first employee 205. When the combined total of cash sales and payment card sales is adequate, employer 230 can take cash funds from the day's cash sales, as well as funds from the day's payment card sales, to make the payroll payment to first employee 205.

As discussed above, employer 230 can take funds from the payment card sales to make the payroll payment to first employee 205. For example, first employee 205 can earn $100 on a day. The payment card sales for the day can be $1000. The $1000 can also be referred to as purchase funds because it is an aggregate of funds to pay for multiple purchases by multiple customers. The PTPC, for example utilizing the buyer/seller platform, can debit the various payment card accounts to obtain the $1000 in payment card sales (i.e., the purchase funds). The employer can pay the $100 payroll payment for first employee 205 by taking $100 of the $1000 in payment card sales. The rest of the amount, less any financial transaction service charges or fees, can be credited to an account associated with employer 230, and can be the credit amount. When needed, the employer can use floated funds for the payroll payment.

When the services charges and fees are zero, the credit amount to credit employer 230 can be the payment card sales of $1000 for the day minus the employee's wages for the day of $100, or $900. A payment card sale can be for a purchase amount, and an aggregate of payment card sales can also be a purchase amount, the purchase amount being an aggregate of the individual purchase amounts. The credit amount, $900, can be less than the purchase amount, $1000.

Further, the credit amount can be based in part on the payroll amount of the first payroll payment. For example, the credit amount ($900) is based on the payroll amount of the first payroll payment ($100), in that the credit amount equals the purchase amount ($1000) minus the first payroll payment ($100). Step 315 can include computer system 250 determining a credit amount to credit the employer for the purchase. In the above example, the credit amount is determined to be $900. The credit amount can be less than the purchase amount. In the above example, the credit amount is $900, which is less than the purchase amount of $1000. The determination of the credit amount is based in part on the payroll amount of the first payroll payment. In the example above, the credit amount of $900 is equal to the purchase amount of $1000 less the payroll amount of the first payroll payment (i.e., $100).

Step 320 includes causing credit funds for the credit amount and taken from the purchase funds to be sent to a financial account associated with the employer, whereby funds remaining from the purchase funds are deemed remaining purchase funds. Step 320 can occur after any of steps 305-315. Using the example of FIG. 2, the employer can be employer 230. Using the example of step 315, the purchase funds can be the $1000, which can be the payment card sales for a day for employer 230. The credit amount can be the $900, which can be the purchase funds of $1000 minus the payroll amount for employee 205 for the day of $100. The credit funds can be the funds to pay the $900 credit amount. A person having ordinary skill in the art will appreciate that the amounts discussed related to the example of FIG. 3 can vary due to service charges and fees associated with the financial transactions of FIG. 3. For example, while the payment card sales for the day for employer 230 can be $1000, a transaction fee, for example 3%, can be charged by entities participating in financial system 260, such as by payment processing service 261 or financial service 262 or bank 263. These fees can result in employer 230 receiving less than is discussed above, for example, $1000 less the 3% financial transaction fee, or $970.

The financial account associated with the employer can be any account associated with the employer that can receive funds. For example, the financial account can be a business account with a bank, such as bank 263, or with a credit union. The financial account can be an account with the PTPC discussed in step 315 and associated with the employer. The PTPC can utilize the buyer/seller platform for the financial account. A person having ordinary skill in the art will appreciate that there are many accounts that can be associated with an employer and which can receive funds. Step 320 includes computer system 250 causing credit funds for the credit amount, an example of the credit amount being the $900, and taken from the purchase funds, an example of the purchase funds being the $1000, to be sent to a financial account associated with the employer, an example of the financial account being an account with the PTPC associated with the employer, the PTPC utilizing the buyer/seller platform for the account. The funds remaining from the purchase funds can also be referred to as remaining purchase funds, which can be the purchase funds of $1000 minus the credit funds of $900, or $100.

Step 325 includes using a portion of the remaining purchase funds for the first payroll payment. Step 325 can occur after any of steps 305-320. Using the example of FIG. 2, the first payroll payment can be a payroll payment to first employee 205 for services rendered to employer 230, which in the example of step 315 is $100. From step 320, the remaining purchase funds can be the purchase funds of $1000 minus the credit funds of $900, or $100. The remaining purchase funds, which can be $100, can be used for the first payroll payment, which can be $100. The purchase funds can be used for the first payroll payment, for example, by taking and using the purchase funds to credit a financial account associated with first employee 230 for the amount of the first payroll payment. When needed, floated funds can be used to credit the financial account associated with first employee 230 for part of all of the first payroll payment.

As a second example, the purchase funds can be used by taking and using the purchase funds to fund a payment card for the amount of the first payroll payment and which can be given to employee 230. The payment card can be, for example, a gift card, a pre-paid credit card, or a pre-paid debit card, among other cards. Step 325 can include computer system 250 using a portion of the remaining purchase funds for the first payroll payment, for example by taking and using a portion of the remaining purchase funds to credit a financial account associated with first employee 230 for the amount of the first payroll payment.

Figure 4:
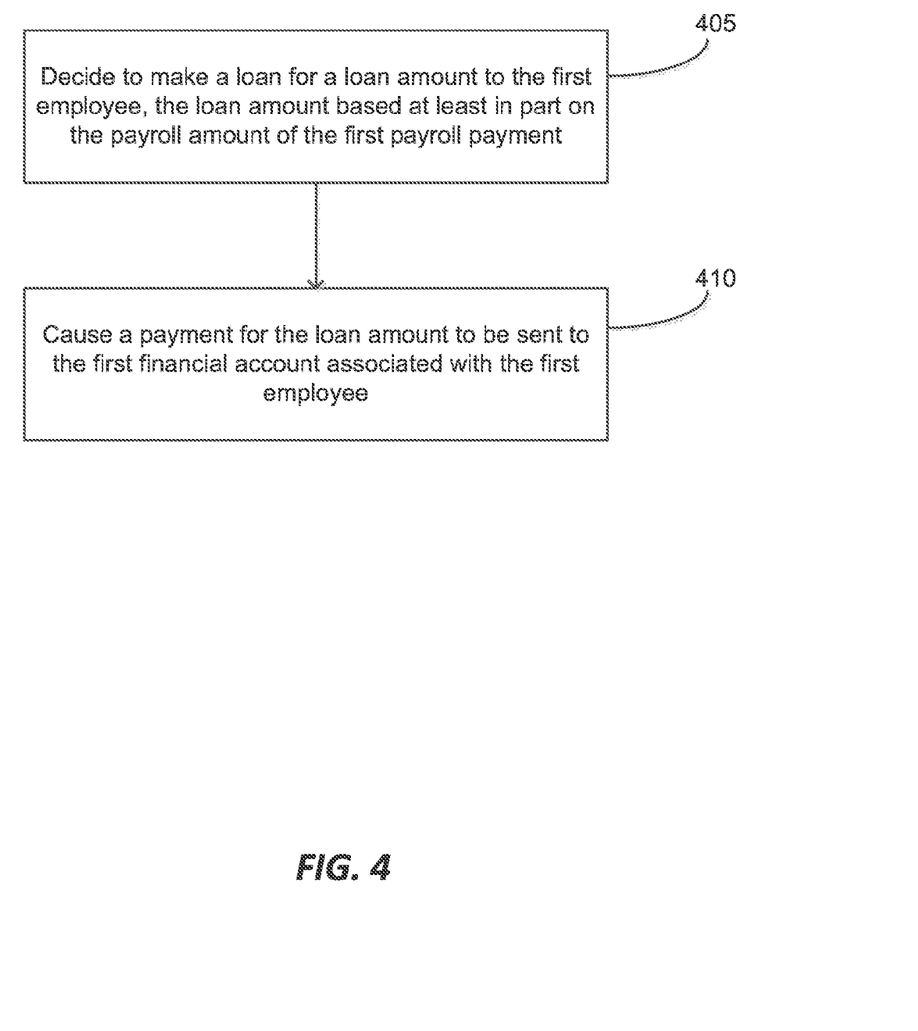
FIG. 4 is a flow chart illustrating operations of a method for making a loan.

Prior to discussing FIG. 4, it may be useful to discuss some concepts and examples. In some embodiments, described at a high level, a financial entity can make a loan to an employee, the amount of the loan based in part on the payroll amount of the employee's payroll payment. An employer can utilize the PTPC to make payroll payments to an employee, and the PTPC can utilize a buyer/seller platform to make the payroll payments to the employee. Resultantly, the PTPC can know the history of payroll payments to the employee, and can have access to the funds that are used to make the payroll payments to the employee. With this information and access to the employee's payroll payment funds, the PTPC can greatly reduce the risk of making a loan to the employee. For example, by having access to the employee's payroll payment history, the PTPC does not need to rely on the accuracy of information provided regarding the employee's payroll payment history. This eliminates the risk of obtaining incorrect or fraudulent payroll payment history for the employee.

By executing appropriate legal agreements with the employee, the PTPC can also greatly reduce the risk of the employee not paying back the loan. With the appropriate legal agreements, the PTPC can take a loan payment from the earnings of the employee prior to sending the payroll payment to the employee. For example, if an employee earns $100 during a payroll pay period, and has a loan payment of $10 due, the PTPC can take the loan repayment of $10 from the employee's earnings. The PTPC can make a payroll payment to the employee for the employee's remaining wages, or $90. As a result of being able to greatly reduce the risk associated with making a loan, the PTPC can charge much lower interest rates and fees than payday loans offered by other companies.

FIG. 4 is a flow chart illustrating operations of a method for making a loan. The following description of FIG. 4 will be described using the system illustrated in FIG. 2, and will refer to labels of that figure. This is a non-limiting example and is done with the intent of making the description of FIG. 4 easier to understand. Note that, in some embodiments, including the embodiment of FIG. 2, all steps of the method of FIG. 4 can be carried out by buyer/seller platform 255 implemented on computer system 250.

Step 405 includes deciding to make a loan for a loan amount to the first employee, the loan amount based in part on the payroll amount of the first payroll payment. Using the example of FIG. 2, the first employee can be first employee 205. A computer, for example a computer on which a buyer/seller platform is implemented, or a person acting for an entity, can have access to the payroll payment history of first employee 205. The entity can be, for example, the PTPC, and employer 230 can have used the PTPC to make past payroll payments to employee 205, as is discussed in step 325 of FIG. 3. The computer, or the buyer/seller platform, or the person can make a decision as to whether to make a loan, as well as on a loan amount, to first employee 205. The decision can be based in part on each of the past payroll payments, each payroll payment made for a payroll amount.

For example, the PTPC may be willing to loan an employee 50% of what the PTPC deems is a likely next payroll amount. If first employee 205 consistently received a payroll payment for a payroll amount of $100 in the past, a decision could be made to make a loan to first employee 205 in the amount of $50. The decision can be based in part on, for example, each of the payroll amounts of past payroll payments made to first employee 205. Step 405 can include a buyer/seller platform implemented on computer system 250 deciding to make a loan for a loan amount to the first employee, for example first employee 205, the loan amount based in part on the payroll amount of the first payroll payment.

Step 410 includes causing a payment for the loan amount to be sent to the first financial account associated with the first employee. Step 410 can occur after step 405. Using the example of FIG. 2, the first employee can be first employee 205. Step 410 can include a buyer/seller platform implemented on computer system 250 causing a payment for the loan amount to be sent to the first financial account associated with the first employee, for example by sending an electronic payment to the first financial account associated with the first employee.

Figure 5:
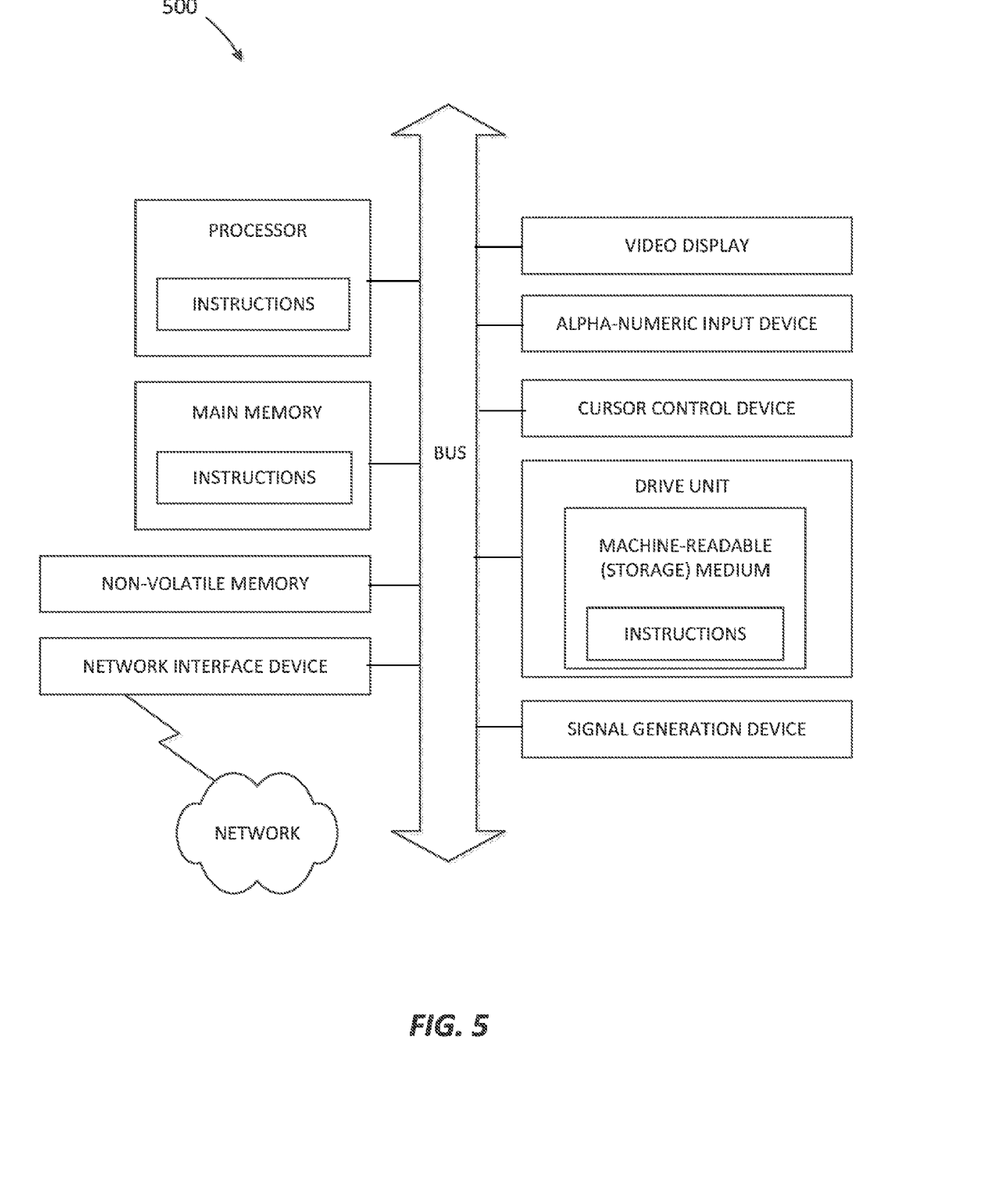
FIG. 5 is a diagrammatic representation of a computer system within which a set of instructions, for causing the machine to perform any one or more of the methodologies or modules discussed herein, may be executed.

FIG. 5 is a diagrammatic representation of a machine in the example form of a computer system within which a set of instructions, for causing the machine to perform any one or more of the methodologies or modules discussed herein, may be executed. In the example of FIG. 5, the computer system 500 includes a processor, memory, non-volatile memory, and an interface device. Various common components (e.g., cache memory) are omitted for illustrative simplicity. Some illustrated components can be omitted in certain embodiments. For example, an embodiment of FIG. 5 that is a server may not need a display device, keyboard, or a mouse. The computer system 500 is intended to illustrate a hardware device on which any of the components depicted in the examples of FIGS. 1-4 (and any other components described in this specification) can be implemented. The computer system 500 can be of any applicable known or convenient type. The components of the computer system 500 can be coupled together via a bus or through some other known or convenient device.

This disclosure contemplates the computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; comprise two or more physical computers; comprise two or more physical computers that cooperate with each other via a network (for example, a wired and/or wireless network); or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

The processor may be, for example, a conventional microprocessor such as an Intel Core microprocessor or an Intel Itanium microprocessor or a Motorola power PC microprocessor or a SPARC architecture processor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) or static RAM (SRAM). The memory can be local, remote, or distributed.

The bus also couples the processor to the non-volatile memory and drive unit. The non-volatile memory cane be a magnetic floppy or hard disk, a magnetic-optical disk, an optical disk, a flash memory such as NAND flash memory or NOR flash memory, a read-only memory (ROM) such as a CD-ROM, a programmable read-only memory such as EPROM or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include a processor, memory, and a device (e.g., a bus) coupling the memory to the processor, among other components.

Software is typically stored in the non-volatile memory and/or the drive unit. Indeed, for large programs, storing the entire program in memory may not even be possible. Nevertheless, one should understand that for software to run, if necessary, the software is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. A person of ordinary skill will appreciate that a modem or network interface can be considered to be part of the computer system 500. The interface can include an analog modem, ISDN modem, cable modem, token ring interface, satellite transmission interface (e.g., "direct PC"), Wi-Fi interface, or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, this disclosure assumes that controllers of any devices not depicted in the example of FIG. 5 reside in the interface.

The computer system can have one Bus or multiple Buses. A bus can include for example, a system bus, a Peripheral Component Interconnect (PCI) bus or PCI-Express bus, a HyperTransport or industry standard architecture (ISA) bus, a small computer system interface (SCSI) bus, a universal serial bus (USB, USB 2.0, USB 3.0), IIC (I2C) bus, an Institute of Electrical and Electronics Engineers (IEEE) standard 1394 bus, also called "Firewire," a QuickPath Interconnect bus, a ThunderBolt interconnect bus, a DisplayPort interconnect bus or its companion standards Mini DisplayPort (mDP), Direct Drive Monitor (DDM), Embedded DisplayPort (eDP), Internal DisplayPort (iDP), Portable Digital Media Interface (PDMI), Wireless DisplayPort (wDP), and Mobility DisplayPort (MyDP), an HDMI interconnect bus, a DVI bus.

In operation, the computer system 500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. Referring to these signals as bits, values, elements, symbols, characters, terms, numbers, or the like has proven convenient at times, principally for reasons of common usage.

One should bear in mind, however, that all of these and similar terms are to be associated with the appropriate physical quantities and are merely convenient labels applied to these quantities. Unless specifically stated otherwise as apparent from the following discussion, one should appreciate that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or constructing more specialized apparatus to perform the methods of some embodiments may prove more convenient. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a laptop computer, a tablet, a set-top box (STB), a personal digital assistant (PDA), a cellular telephone, an iPhone, a Blackberry, a smart phone, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), Blu-ray disks, among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

A person having ordinary skill in the art will appreciate that there are various other ways to implement the described functionality. The scope of this disclosure also includes embodiments implementing the described functionality in these various other ways. Accordingly, the scope of the present disclosure is intended to embrace all such alternatives, modifications, and variations as fall within the scope of the claims, together with all equivalents thereof.

Numerous specific details are set forth in order to provide a thorough understanding of embodiments of the present invention. One skilled in the art will appreciate that embodiments of the present invention may be practiced without some of these specific details. In other instances, well-known structures and devices are shown in block diagram form.

Embodiments of the present invention include various steps. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

What is claimed is:

1. A method comprising:
    enabling, by a buyer/seller platform implemented on a networked computer system, a plurality of merchants to receive electronic payments made by a plurality of customers, the electronic payments associated with sales of goods or services to the plurality of customers,
        the electronic payments made by the plurality of customers by use of payment cards,
        the buyer/seller platform processing the electronic payments made by use of the payment cards, the processing including obtaining funds from accounts associated with the payment cards and depositing a portion of the funds in the merchants' bank accounts, whereby the funds from the accounts associated with the payment cards are payment card funds;
    sending a message, by the buyer/seller platform, that causes a first mobile device to present a payroll pay period interface to a first employee of the plurality of employees of the merchant, the payroll pay period interface being able to accept a designation of a payroll pay period capable of being customized by each employee of the plurality of employees, the merchant being a merchant of the plurality of merchants;
    receiving, by the buyer/seller platform and from the first mobile device, a designation of a first customized payroll pay period made by the first employee;
    updating, by the buyer/seller platform, a payroll database based on the first customized payroll pay period designation;
    receiving on a first date, by the buyer/seller platform, from a first point of sale (POS) system of the merchant, first payment card information for a first electronic payment made to the merchant by a first customer;
    sending a message, by the buyer/seller platform, to trigger a first electronic transfer of a first payroll payment to be sent to the first employee on the first date,
        wherein the first electronic transfer of the first payroll payment is based on funds, not yet received by the merchant or the buyer/seller platform, from the first electronic payment,
        wherein the first date corresponds to the first customized payroll pay period designation,
        wherein the first electronic transfer of the first payroll payment includes a credit of funds for the first payroll payment to an account of the first employee, and
        wherein the funds from the first electronic payment are received, by the buyers/seller platform or by the merchant, after the credit of the funds for the first payroll payment occurs;
    sending a message, by the buyer/seller platform, that causes a second mobile device to present a pay period interface to a second employee of the plurality of employees;
    receiving, by the buyer/seller platform and from the second mobile device, a designation of a second customized payroll pay period made by the second employee;
    updating, by the buyer/seller platform, the payroll database based on the second customized payroll pay period designation;
    receiving on a second date, by the buyer/seller platform, from a second POS system of the merchant, second payment card information for a second electronic payment made to the merchant by a second customer;
    sending a message, by the buyer/seller platform, to trigger a second electronic transfer of a second payroll payment to be sent to the second employee on the second date,
        wherein the second electronic transfer of the second payroll payment is based on funds, not yet received by the merchant or the buyer/seller platform, from the second electronic payment, and
        wherein the second date corresponds to the second customized payroll pay period designation.

2. The method of claim 1,
    wherein the first and the second employees both perform a same job function and have a same payroll categorization, and
    wherein the same payroll categorization is one of a salaried employee or an hourly employee.

3. The method of claim 2,
    wherein the first and the second employees both work on a same day,
    wherein the first payroll payment includes payment for the first employee's work on the same day, and the first payroll payment is sent on the first date,
    wherein the second payroll payment includes payment for the second employee's work on the same day, and the second payroll payment is sent on the second date, and
    wherein the first date and the second date are different dates.

4. The method of claim 1, wherein the payroll pay period interface presented to the first employee enables the first employee to select from a list of payroll pay period designations that includes payroll payments sent each day the first employee works, payroll payments sent each week, payroll payments sent every other week, payroll payments sent twice a month, and payroll payments sent each month.

5. A method comprising:
- enabling, by a buyer/seller platform implemented on a computer system, a plurality of merchants to receive electronic payments associated with sales of goods or services;
- receiving, by the buyer/seller platform and from a first mobile device, a designation of a first custom payroll pay period made, via the first mobile device, by a first employee of a plurality of employees of a merchant of the plurality of merchants;
- receiving, by the buyer/seller platform and from a second mobile device, a designation of a second custom payroll pay period made, via the second mobile device, by a second employee of the plurality of employees;
- receiving on a first date, by the buyer/seller platform, from a first point of sale (POS) system of the merchant, first payment card information for a first electronic payment to the merchant;
- sending a message, by the buyer/seller platform, to trigger a first electronic transfer of a first payroll payment for a first payroll amount to an account of the first employee on the first date, the first electronic transfer of the first payroll payment being based on funds, not yet received by the merchant or the buyer/seller platform, from the first electronic payment,
  - wherein the first date corresponds to the designation of the first custom payroll pay period;
- receiving on a second date, by the buyer/seller platform, from a second POS system of the merchant, second payment card information for a second electronic Payment to the merchant; and
- sending a message, by the buyer/seller platform, to trigger a second electronic transfer of a second payroll payment for a second payroll amount to an account of the second employee on the second date, the second electronic transfer of the second payroll payment being based on funds, not yet received by the merchant or the buyer/seller platform, from the second electronic payment,
  - wherein the second date corresponds to the designation of the second custom payroll pay period, and
  - wherein either
    - the first employee and the second employee both perform the same job function, have the same payroll categorization, and the first custom payroll pay period and the second custom payroll pay period are different pay periods, or
    - the first employee and the second employee perform different job functions and have different payroll categorizations.

6. The method of claim 5, wherein the first electronic transfer of the first payroll payment uses floated funds to be repaid via the buyer/seller platform processing electronic payments that were made on the first date.

7. The method of claim 6, wherein the buyer/seller platform enables the first employee to purchase a good or a service from a second merchant of the plurality of merchants on the first date using the floated funds from the first payroll payment.

8. The method of claim 5, wherein the first employee and the second employee both perform the same job function and have the same payroll categorization, wherein the same payroll categorization is one of a salaried employee and an hourly employee, and wherein the same job function is an assembly line worker working on a same assembly line.

9. The method of claim 5,
- wherein the first and the second employees both work on the same day,
- wherein the first payroll payment includes payment for the first employee's work on the same day,
- wherein the second payroll payment includes payment for the second employee's work on the same day, and
- wherein the first date and the second date are different dates.

10. The method of claim 5,
- wherein the electronic payments are made using payment cards,
- wherein the buyer/seller platform processes payments made using the payment cards including obtaining funds from accounts associated with the payment cards and depositing a portion of the funds in the merchants' bank accounts, whereby the funds from the accounts associated with the payment cards are payment card funds,
- wherein the first payroll payment using the funds from the electronic payments includes using funds from the payment card funds, and
- wherein the portion of the funds that are deposited in the merchant's bank account are reduced by an amount corresponding to the payment card funds used for the first payroll payment.

11. The method of claim 10, wherein the payment card is one of a credit card, a charge card, an automated teller machine (ATM) card, a debit card, a pre-paid credit card, a pre-paid debit card, a gift card, a stored value card, a fleet card, a magnetic stripe card, a smart card, a proximity card, a re-programmable magnetic stripe card, a card containing a quick response (QR) code, and a card containing a bar code.

12. The method of claim 5, wherein a custom payroll pay period for a selected employee can be designated to be any one of payroll payments sent each day the selected employee works, sent each week, sent every other week, sent twice a month, or sent each month.

13. The method of claim 5, further comprising:
- causing the first mobile device to present a payroll pay period interface to the first employee,
  - wherein the payroll pay period interface enables the first employee to designate the first custom payroll pay period by selecting a payroll pay period from a pre-defined list of payroll pay periods, the pre-defined list of the payroll pay periods including at any of once a week, once every other week, twice a month, or once a month, and
  - wherein the payroll pay period interface enables the first employee to designate the first custom payroll pay period by variably defining the first custom payroll pay period, the variably defined first custom payroll pay period having a value greater than or equal to once a day.

14. The method of claim 5, further comprising:
- deciding to make a loan for a loan amount to the first employee, the loan amount based in part on the first payroll amount of the first payroll payment, and
- causing a payment for the loan amount to be sent to the account of the first employee.

15. The method of claim 14, wherein a portion of the loan amount is repaid using a portion of the first payroll payment after the loan amount is sent to the account of the first employee.

16. A computer system comprising:
- a processor;
- a storage device; and a memory coupled with the processor, the memory storing instructions which when executed by the processor cause the computer system to perform operations including:

implementing a buyer/seller platform, the buyer/seller platform enabling a plurality of merchants to process electronic payments associated with sales of goods or services;

receiving, via the buyer/seller platform and from a first mobile device, a first designation of a first custom payroll pay period made by a first employee of a plurality of employees of a merchant of the plurality of merchants, each of the plurality of employees being able to designate a custom payroll pay period;

updating a database on the storage device based on the first designation;

receiving on a first date, from a first point of sale (POS) system of the merchant, first payment card information for a first electronic payment to the merchant;

sending a message, by the buyer/seller platform, to trigger a first electronic transfer of a first payroll payment for a first payroll amount to an account of the first employee on a first date corresponding to the first designation of the first custom payroll pay period, the first electronic transfer of the first payroll payment being based on funds, not yet received by the merchant or the buyer/seller platform, from the first electronic payment;

receiving, via the buyer/seller platform and from a second mobile device, a second designation of a second custom payroll pay period made by a second employee of the plurality of employees;

updating the database on the storage device based on the second designation;

receiving on a second date, from a second POS system of the merchant, second payment card information for a second electronic payment to the merchant; and sending a message, by the buyer/seller platform, to trigger a second electronic transfer of a second payroll payment for a second payroll amount to an account of the second employee on a second date corresponding to the second designation of the second custom payroll pay period, the second electronic transfer of the second payroll payment being based on funds, not yet received by the merchant or the buyer/seller platform, from the second electronic payment.

17. The computer system of claim 16, wherein the first electronic transfer of the first payroll payment uses floated funds to be repaid via the buyer/seller platform processing electronic payments that were made on the first date.

18. The computer system of claim 17, wherein the buyer/seller platform enables the first employee to purchase a good or a service from a second merchant of the plurality of merchants on the first date using the floated funds from the first payroll payment.

19. The computer system of claim 16, wherein the first employee and the second employee both perform a same job function and have a same payroll categorization, and wherein the same payroll categorization is one of a salaried employee and an hourly employee.

20. The computer system of claim 16, wherein the first and the second employees both work on the same day, wherein the first payroll payment includes payment for the first employee's work on the same day, wherein the second payroll payment includes payment for the second employee's work on the same day, and wherein the first date and the second date are different dates.

21. The method of claim 5, wherein the first mobile device and the second mobile device are the same device, wherein when the buyer/seller platform enables the plurality of merchants to receive electronic payments associated with the sales of goods or services, the buyer/seller platform enables the plurality of merchants to receive electronic payments associated with the sales of goods and services.

* * * * *